(12) United States Patent
Bailey et al.

(10) Patent No.: US 7,486,834 B2
(45) Date of Patent: Feb. 3, 2009

(54) SYSTEM AND METHOD FOR DYNAMICALLY SHIFTING ERROR DIFFUSION DATA

(75) Inventors: James R. Bailey, Shelbyville, KY (US); David A. Crutchfield, Georgetown, KY (US); Shaun T. Love, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 714 days.

(21) Appl. No.: 11/037,559

(22) Filed: Jan. 18, 2005

(65) Prior Publication Data

US 2006/0158692 A1 Jul. 20, 2006

(51) Int. Cl.
*G06K 9/36* (2006.01)
*G06K 9/38* (2006.01)

(52) U.S. Cl. .................. 382/252; 382/232; 382/233; 382/244; 382/245; 358/3.03

(58) Field of Classification Search ......... 382/232–233, 382/244, 245, 246, 250, 251, 252; 358/3.03; 345/616
See application file for complete search history.

(56) References Cited

U.S. PATENT DOCUMENTS

| | | | |
|---|---|---|---|
| 5,321,525 A | 6/1994 | Hains | |
| 5,325,211 A | 6/1994 | Eschbach | |
| 5,353,127 A | 10/1994 | Shiau | |
| 5,521,989 A | 5/1996 | Fan | |
| 5,931,960 A * | 8/1999 | Kletter et al. | 714/704 |
| 5,974,228 A | 10/1999 | Heitsch | |
| 6,026,199 A | 2/2000 | Sommer | |
| 6,072,591 A | 6/2000 | Harrington | |
| 6,266,157 B1 | 7/2001 | Fan | |
| 6,307,647 B1 | 10/2001 | Cheung | |
| 6,343,159 B1 | 1/2002 | Cuciurean-Zapan | |
| 6,356,362 B1 | 3/2002 | Ostromoukhov | |
| 6,496,603 B1 | 12/2002 | Chang | |
| 6,526,531 B1 * | 2/2003 | Wang | 714/704 |
| 6,552,823 B1 | 4/2003 | Chang | |
| 6,608,700 B1 | 8/2003 | Mantell | |
| 6,614,556 B1 | 9/2003 | Hong | |
| 6,678,073 B1 | 1/2004 | Jewitt | |
| 6,751,358 B1 | 6/2004 | Mantell | |
| 6,771,832 B1 * | 8/2004 | Naito et al. | 382/252 |
| 2002/0051212 A1 | 5/2002 | Ostromoukhov | |
| 2002/0181023 A1 | 12/2002 | Gorian | |
| 2003/0103241 A1 * | 6/2003 | Sharma | 358/3.06 |
| 2003/0112468 A1 | 6/2003 | Eschbach | |
| 2005/0117805 A1 * | 6/2005 | Poutet et al. | 382/232 |
| 2006/0143454 A1 * | 6/2006 | Walmsley | 713/170 |

* cited by examiner

*Primary Examiner*—Matthew C. Bella
*Assistant Examiner*—Ali Bayat (57) ABSTRACT

Error diffusion is performed using a Floyd-Steinberg-like approach. A integer-representation of a running error is compressed by storing only its most significant bits and returning any remainder to the error diffusion processor. The running error is shifted to the right until only the desired number of significant bits remain, and this compressed error is stored. Any portion of the original running error that is lost due to the shifting is treated as a remainder and is returned to the error diffusion processor for use in calculating an adjusted current pixel value. The amount of the shift is retained in compressed form to keep track of the number of shifts needed to form a truncated running error from the compressed running error.

21 Claims, 6 Drawing Sheets

SYSTEM AND METHOD FOR DYNAMICALLY SHIFTING ERROR DIFFUSION DATA

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Invention

The present invention is directed to systems and methods for implementing error diffusion when processing an image, such as for printing.

2. Description of the Related Art

When printing an image using an output device which places discreet units of colorants (ink drops, toner, etc.) on media, it is necessary to reduce the range of the image pixels to match the reproduction capabilities of the printing device. This typically means a reduction in the bit resolution of the image.

Most often, the reduction in bit resolution is accomplished by halftone transformation. Halftone transformation results, on a pixel-by-pixel basis for all image pixels, in the replacement of an original non-binary, or "gray-level" value of, e.g., 8 bits, with a binary value after comparison with some threshold. The threshold itself may vary dynamically depending on the non-binary pixel value, and other factors. The original 8-bit value at each pixel is thus substituted by either a "0" (representing an 8-bit value of 0) or a "1" (representing an 8-bit value of 255). The consequence of such a transformation at a pixel is that the overall "brightness" of the image is changed. To mitigate this, the change, or "error", may be diffused to nearby, as yet untransformed pixels through a technique known as error diffusion. Error diffusion works by spreading the inaccuracy, or error, of the halftone decision at one pixel in the output image among nearby pixels, creating a visually superior transformation. Each original pixel value is adjusted based on the error contributed by adjacent and nearby pixels, and these contributions are taken into account in calculating the correct transformed value for the pixel.

There are a number of error diffusion techniques, each of which uses a different combination of thresholding approaches, collection of nearby pixels to which the error is spread, error weightings to each of these nearby pixels, and other factors. The Floyd-Steinberg algorithm, developed in 1975 and known to those skilled in the art, is one of the more well-known implementations of error diffusion. This algorithm generates a series of error values for each image element as an image line is transformed. These error values are calculated by taking a fraction of nearby pixel error values and adding them together to represent a pixel location.

Figure 4A:
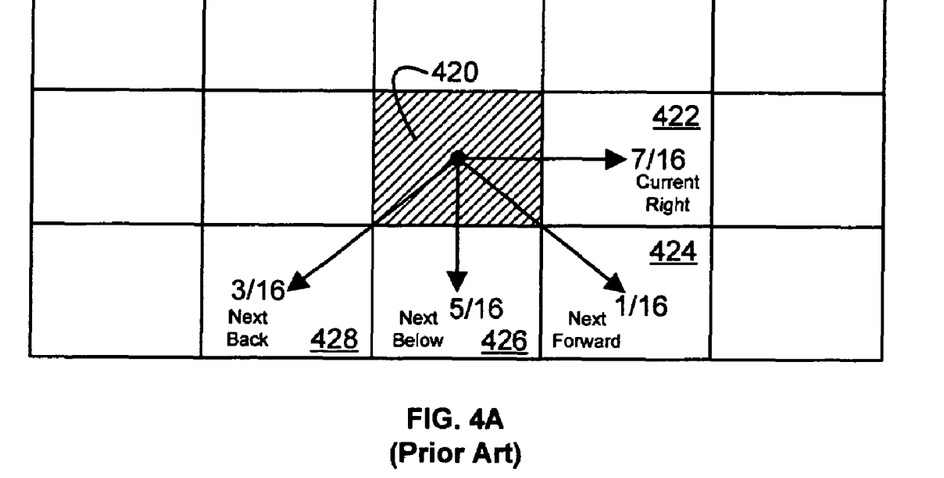
FIG. 4A illustrates the prior art principle of error spread weights applied to the error of a transformed pixel.

In the Floyd-Steinberg algorithm, the error at a transformed pixel 420 is spread to a collection of four specific nearby pixels in the fashion shown in FIG. 4A. The error from a just-transformed pixel 420 is spread to pixels 422, 424, 426 and 428 using error spread weights $7/16$, $1/16$, $5/16$ and $3/16$, respectively, the error spread weights representing the proportion of error at transformed pixel 420 that is spread to each adjacent untransformed, error-receiving pixel. Thus, from the perspective of a just-transformed pixel 420, its total error is spread to "Next Back" pixel 428 (with "send backward coefficient" $3/16$), "Next Below" pixel 426 (with "send below coefficient" $5/16$), "Next Forward" pixel 424 (with "send forward coefficient" $1/16$), and "Current Right" pixel 422 (with "send right coefficient" $7/16$). In the foregoing nomenclature, the prefix "Next" refers to the next line to which the corresponding errors are spread.

Figure 4B:
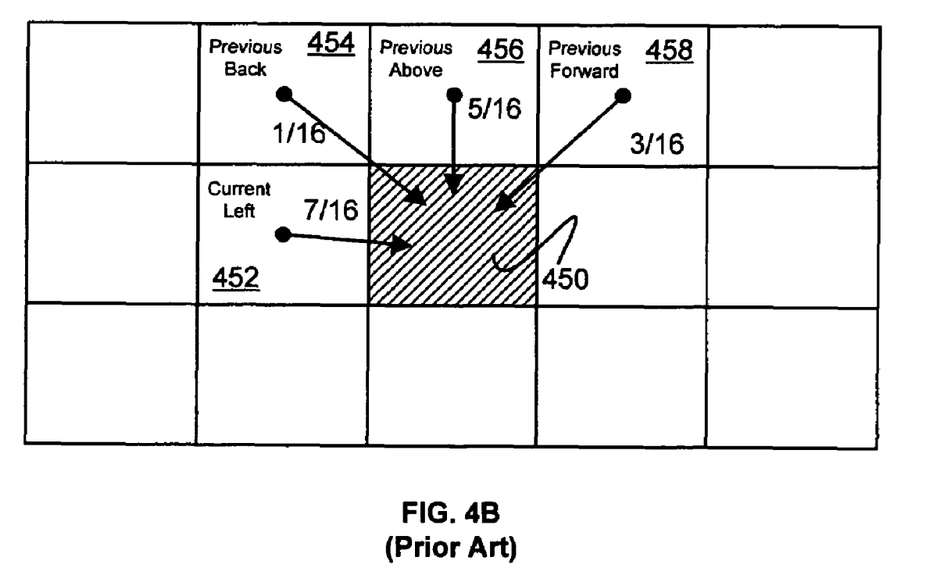
FIG. 4B illustrates the prior art principle of error spread weights received by a pixel to be transformed.

FIG. 4B shows receipt of partial errors from the perspective of a pixel 450 that is about to be transformed using Floyd-Steinberg error diffusion. Soon-to-be transformed pixel 450 receives a portion of the error from each of four nearby, previously transformed pixels 452, 454, 456 and 458, using error spread weights of $7/16$, $1/16$, $5/16$ and $3/16$, respectively. Of these, pixels 454, 456 and 458 are on the previous line ("above"), while recently-transformed pixel 452 is immediately to the left of untransformed pixel 450, on the current line. From the perspective of untransformed pixel 450, error is received from "Previous Back" pixel 454 (with "receive backward coefficient" $1/16$), "Previous Above" pixel 456 (with "receive above coefficient" $5/16$), "Previous Forward" pixel 458 (with "receive forward coefficient" $3/16$), and "Current Left" pixel 452 (with "receive left coefficient" $7/16$). In the foregoing nomenclature, the prefix "Previous" refers to the previous line from which the corresponding errors are received.

From the foregoing description, it can be seen that in the Floyd-Steinberg algorithm the error created from transforming a pixel is spread to four adjacent pixels. Furthermore, prior to transformation, each pixel receives a portion of the error from each of the four adjacent pixels that have previously been transformed.

The Floyd-Steinberg algorithm typically operates in row order (sometimes called "line order"). That is, an entire row, or line, of an image is transformed before the next row or line is transformed. Transformation of a row results in the storage of a large number of error values. For instance, if an image has a resolution of 600 pixels per inch (PPI), and each row of the image is 9 inches wide, then 5400 pixels worth of error data, each error datum comprising anywhere from 1 color (for a black & white printer) to 3 or more colors (for a color printer), may need to be stored.

Originally, the Floyd-Steinberg algorithm was implemented in software with data being read from, and written to a main memory having ample space. More recently, however, high-speed ASIC-based hardware implementations using integer arithmetic have been realized. For cost reasons, it is best to minimize the amount of memory used in such implementations.

SUMMARY OF THE INVENTION

The target platform for a system in accordance with the present invention is a device, such as a printer, that is configured to perform error diffusion on image data pixels, each image data pixel comprising a non-binary pixel value.

In one aspect, the present invention is directed to an error diffusion system configured to perform halftoning of image pixel data. The system comprises an error diffusion processor configured to receive a current pixel from a current image line and output an error diffused current pixel in response thereto; a first decompressor connected to the error diffusion processor and configured to decompress a compressed previous running error of a pixel belonging to a previous line of the image for use in calculating an adjusted pixel value of said current pixel; and a first compressor connected to the error diffusion processor and configured to compress a current running error of said current pixel to thereby form a compressed current running error for the current pixel.

In another aspect, the present invention is also directed to a method for handling running error values during a halftoning process of an image. The method entails decompressing a compressed previous running error of a pixel belonging to a previous line of said image to form a truncated previous running error for use in calculating an adjusted pixel value of a current pixel in a current line of an image; and compressing a current running error of that same current pixel to thereby form a compressed running error for that pixel.

In still another aspect, the present invention is directed to an error diffusion system for halftoning image data pixels one image line at a time, the system configured to calculate an adjusted pixel value for a current pixel in a current image line, the adjusted pixel value including partial errors from pixels on a previous image line, wherein the partial errors from the pixels on the previous image line are calculated only after halftoning of entire previous line has been completed.

BRIEF DESCRIPTION OF THE DRAWINGS

The invention is now described with reference to the attached drawings in which.

DETAILED DESCRIPTION

Figure 1:
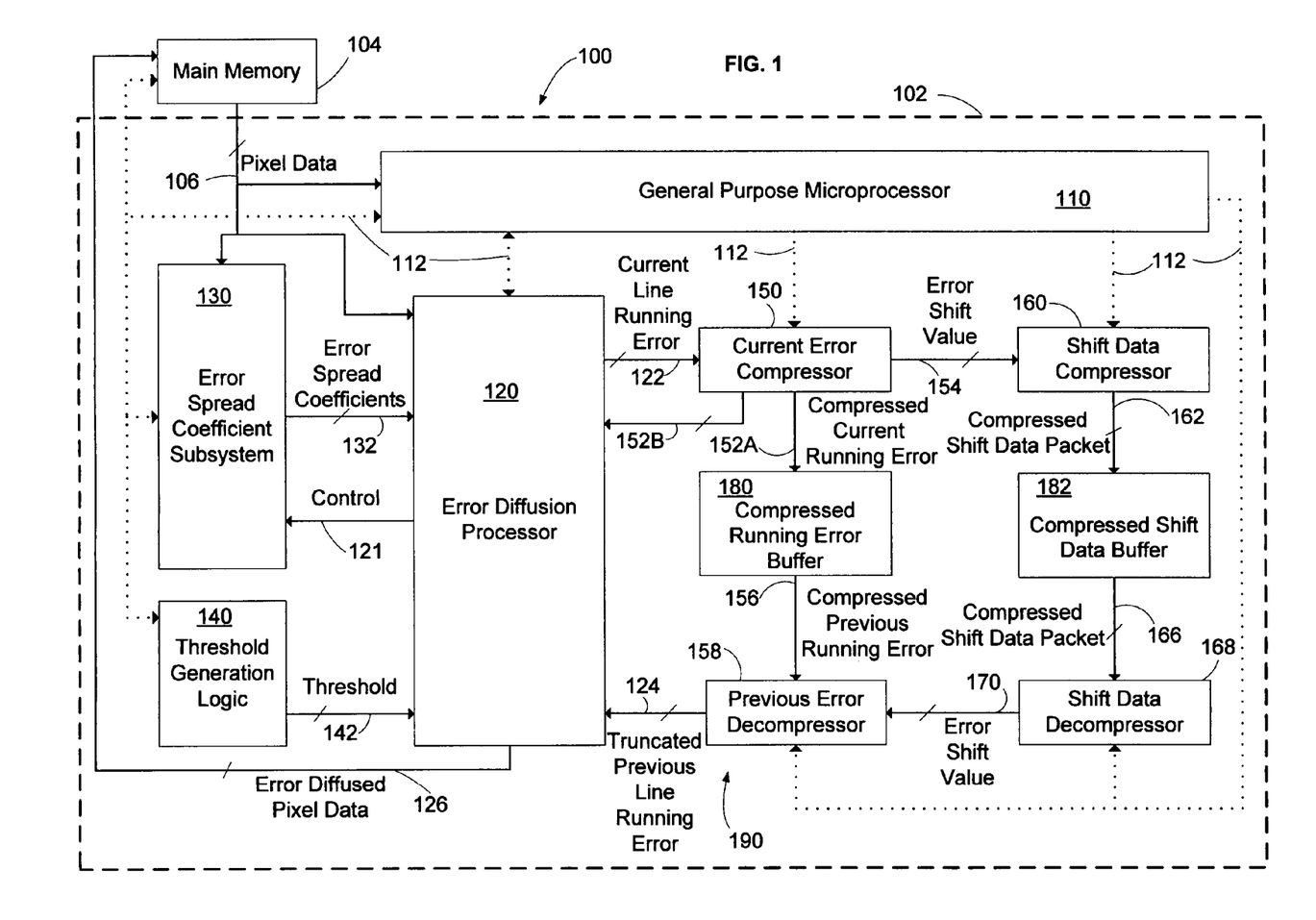
FIG. 1 shows an error diffusion system in accordance with the present application.

FIG. 1 shows a block diagram of an error diffusion system 100 in accordance with an embodiment of the present invention. The system 100 can belong to a printer that receives an image with multi-bit data pixels and outputs halftone images while using an error diffusion algorithm. The system can be part of a stand-alone printer of the sort capable of printing photographs directly from a digital camera without first having to download the photographs to a personal computer.

The system 100 includes a general purpose microprocessor 110 that is connected to a main memory 104. Main memory 104 typically stores the input pixel data 106 of an image whose pixels are to be transformed from a non-binary format to a binary format, using error diffusion. The microprocessor 110 is part of an Application Specific Integrated Circuit (ASIC) 102 (represented by the dashed) configured to implement error diffusion. The dotted arrows represent connections between the microprocessor 110 and the other components of the ASIC, through data buses, control buses and other structures known to those skilled in the art of integrated circuit design. While in this embodiment, the error diffusion is performed using hardware on the ASIC, it can instead be performed entirely in software by the microprocessor 110. It is further understood that in some embodiments, the main memory 104 can also be part of the ASIC 102, or the input pixel data can be stored in a local memory on-board the ASIC.

In addition to the microprocessor 110, the ASIC 102 includes an error diffusion processor 120, and error spread coefficient subsystem 130, threshold generation circuitry 140, and a running error compression/decompression subsystem, shown generally at 190.

The error diffusion processor 120 receives pixel data 106 from the main memory 104, error spread coefficients 132 from the error spread coefficient system 130, and threshold information 142 from threshold generation circuitry 140. The error diffusion processor 120 uses this information, along with the truncated previous line running error information 124 provided by the error compression/decompression subsystem 190, to transform the pixel data 106 into error diffused pixel data 126 which is stored in the main memory or in another memory location. Control signals 121 are sent from the error diffusion processor 120 to the error spread coefficient system 130 for requesting coefficients and performing other functions.

The error spread coefficient system 130 receives input 112 from the microprocessor 110 and pixel data 106 in the case of data-driven determinations of the error spread coefficients. The error spread coefficient system 130 provides the error diffusion processor 120 with the error spread coefficients 132 to be used in allocating the error from a transformed pixel. As discussed further below, the error spread coefficient system 130 may be implemented in a number of different ways.

The threshold generation circuitry 140 creates a threshold 142 that is used to compare with each adjusted non-binary (e.g., 8 bit) gray level pixel datum to determine whether the corresponding pixel is to be set to "0" or "1". The threshold generation circuitry 140 is under the control of the microprocessor 110 and can include pseudo-random circuitry or the like to form a dynamic threshold, in a known manner.

As is known to those skilled in the art, the error diffusion processor 120 typically processes image pixel data in line order—each pixel belonging to one line of an image is error diffused, before pixels of the next line are processed. The running error compression/decompression subsystem 190, described in further detail below, is used to efficiently store the total error at each transformed pixel in an immediately preceding row of image data for use in adjusting a current pixel value of a pixel in a current row of image data.

Figure 3:
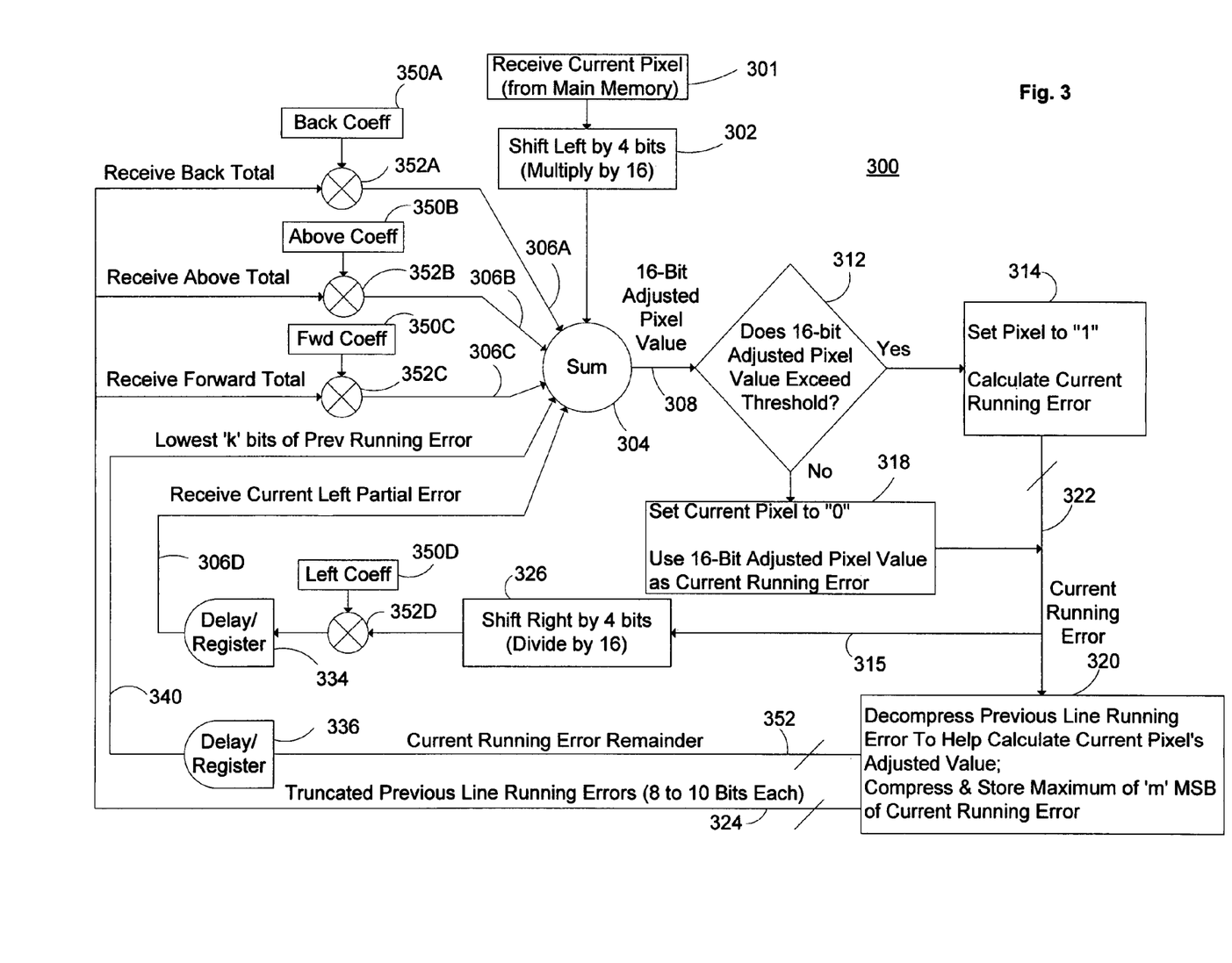
FIG. 3 shows a block diagram of an error diffusion processor implementation in accordance with an embodiment of the present application.

FIG. 3 illustrates the operation of the error diffusion processor 120 of FIG. 1, which performs most operations using 16-bit integer math for increased precision.

The first step 301 is to receive the 8-bit value of a current pixel, from main memory 104. The next step 302 is to shift this pixel value left by four bits, which is equivalent to multiplying by 16. At this point, the original 8-bit pixel has been transformed into having 12 significant bits. The transformed pixel is then input into a summer 304 along with five other inputs designated 306A, 306B, 306C, 306D and 340, to form a 16-bit adjusted pixel value 308.

Input error 306A is the partial error received by the current pixel from the transformed pixel in the preceding row and to the left ("previous back"). Input error 306A is the product of an 8 to 10 bit representation of the truncated running error from transformed "previous back" pixel and a 4-bit representation of the "receive backward coefficient" 350A, both of which are input to a first integer multiplier 352A.

Input error 306B is the partial error received by the current pixel from the transformed pixel in the preceding row and directly above ("previous above"). Input error 306B is the product of an 8 to 10 bit representation of the truncated running error from transformed "previous above" pixel and a 4-bit representation of the "receive above coefficient" 350B, both of which are input to a second integer multiplier 352B.

Input error 306C is the partial error received by the current pixel from the transformed pixel in the preceding row and to the right ("previous forward"). Input error 306C is the product of an 8 to 10 bit representation of the truncated running error from transformed "previous forward" pixel and a 4-bit representation of the "receive forward coefficient" 350C, both of which are input to a third integer multiplier 352C.

Input error 306D is the partial error received by the current pixel from the just-transformed pixel immediately to the left in the current row ("current left"). Input error 306D is delayed by delay 334 and is the delayed product of an 8 to 10 bit representation of the truncated running error from the immediately preceding (i.e., just-transformed pixel) and a 4-bit representation of the "receive left coefficient" 350D, both of which are input to a fourth integer multiplier 352D.

In the foregoing discussion of the input errors 306A, 306B, 306C, 306D, the term 'truncated running error' refers to the fact that the least significant bits of the various running errors have been set to zero by retaining only the most significant bits and/or shifting to the right, as discussed further below.

Finally, input error 340 is delayed by delay 336 and is the delayed version of a 4 to 6 bit current remainder 352 (152B in FIG. 1) comprising the least significant bits that have been stripped off the current running error by the error compression/decompression subsystem 190 during the compression process.

Once the 16-bit adjusted current pixel value 308 has been formed by the summer 304, a decision 312 is made to determine whether it exceeds a threshold. If the 16-bit adjusted current pixel value 308 exceeds the threshold 142, then, in block 314, the current pixel is set to "1" and the current running error 322 is calculated. If, on the other hand, the 16-bit adjusted current pixel value 308 does not exceed the threshold 142, then, in block 318, the current pixel is set to "0" and the 16-bit adjusted pixel value is used as the current running error 322. Thus, the current running error 322 is the outcome of the halftoning decision represented by decision block 312 and blocks 314, 318.

In either case, the current running error 322 is tapped, as shown by line 315, and input to a shifter 326 where it undergoes a right shift (i.e., a divide by 16). The output of the shifter 326 is then input to the aforementioned fourth multiplier 352D to help form the 'current left' error 306D which is delayed by delay 334 and which is to be provided to the pixel immediately to the right on the same line for use in the next iteration.

One consequence of the design shown in FIG. 3 is that the partial errors 306A, 306B, 306C, contributed by the three pixels on a previous image line are calculated only after halftoning of the entire previous line has been completed. For a current pixel on a current image line, the partial errors from pixels on the previous line are calculated only after halftoning of the immediately preceding pixel (the pixel to the left) on the current image line has been completed. Moreover, these partial errors from the pixels on the previous image line are calculated only after decompressing compressed running errors corresponding to those pixels.

The current running error 322 is also input to the error compression/decompression block 320, representing the error compression/decompression subsystem 190 of FIG. 1.

The output of the error compression/decompression block 320 comprises the aforementioned current running error remainder 352, (152B in FIG. 1) and the truncated previous line running error 324, (124 in FIG. 1). The previous line truncated running error 324 comprise the total error at each transformed pixel on the previous line, and three of these are needed at any given time, the three corresponding to the "previous back", previous above" and "previous forward" total errors. It is understood that pipelined systems, buffers and other hardware in the ASIC accommodates this.

Returning to FIG. 1, the error compression/decompression subsystem 190 includes a first error compressor 150 for compressing each current running error value 122. As it comes in, each current running error 122 is an N=16 bit value, and so the current running error has bit positions in the range [15:0], with 0 denoting the least significant bit. While it is possible to store all N=16 bits, this would mean that one would have to store on the order of 5400 (assuming 600 ppi and 9 inches) pixel's worth of data, or roughly 86,400 bits per line. The first error compressor 150 helps reduce this total. In particular, the first error compressor 150 stores a maximum of m most significant bits (MSB) of each 16-bit current running error value 122. M is selected to be equal to 8 bits (m=8), although it can be some other number.

During operation, the first error compressor 150 checks to see the position of the most significant bit in the current running error 122.

If it is determined that the position of the most significant bit in the current running error 122 is between bit positions J=0 and J=11, then the current running error 122 is shifted to the right by k=4. The thus-shifted version of the current running error 122 is considered to be the compressed current running error 152A (since the most significant bit, after shifting, is now between bit positions 0-7), and the lowest four bits of current running error 122 (originally in bit positions 0-3) are simply returned 152B (352 in FIG. 3) to the error diffusion processor 120 as a remainder.

If, however, it is determined that the position of the most significant bit in the current running error 122 is between bit positions J=12 and J=14 then the current running error 122 is shifted to the right by an amount necessary to cause the m=8 most significant bits to occupy bit positions 0-7 to thereby create the compressed current running error 152A.

For example, given that the most significant bit is in bit position J=12, the first error compressor 150 shifts the entire current running error value to the right an appropriate amount (in this example, k=5 shifts to the right) until the most significant bit falls into the bit position 7. This way, only m=8 bits need to be stored as the compressed current running error 152A, along with the shift data value 154.

Continuing with this example, the k=5 least significant bits (LSBs) are packed into an 8-bit word and returned 152B (352 in FIG. 3) to the error diffusion processor 120 as a remainder for use in summing errors for the next pixel, as discussed above. Therefore, in the system of FIG. 1, the error compressor 150 outputs an error shift value 154 in addition to the m-bit compressed running error 152A.

In a sense, one can consider the m=8 MSBs of the compressed running error to be a mantissa and the error shift value k=5 to be an exponent. The m=8 bit mantissa can then be shifted to the left by the k=5 error shift value to form a truncated previous line running error 124 which has a magnitude on the order of the its original running error 122, and differs from its original running error 122 by just the k=5 least significant bits which, in any event, have been recycled as remainder 152B (352 in FIG. 3).

As stated above, N is a 16 bit value, and so the current running error has bit positions in the range [15:0], with 0 denoting the least significant bit. It is understood in the foregoing example that if the most significant bit were in bit position J=11, instead of bit position J=12 in the N=16 bit current running error 122 (322 in FIG. 3), the mantissa would still be m=8 bits, but there would only be a shift of k=4. Because the amount of required shift can vary among the running errors, we refer to this process of keeping a constant number of most significant bits while varying the amount of the shift as "dynamic shifting". Furthermore, while in the above example m=8, it is understood that m may take on another value, such as m=5 in which case the coarseness of the truncated running error would increase as well due to the lower resolution in the compressed error.

From the foregoing, it can be seen that shifting effectively compresses the original 16-bit current running error value 122 from the original N=16 bits down to m=8 bits. The resulting shifted value is output as an m=8 bit "compressed current running error" 152A and sent to the compressed running error buffer 180 where it is stored.

The error shift value 154 (which in this example is k=5) is passed on to shift data compressor 160. The error shift values 154 (the "exponents") corresponding to the compressed current running errors 152A for a number of successive 16-bit current running error values 122 are often the same, or vary by 1, at most. Therefore, run length encoding (RLE) of the error shift values can be performed by the shift data compressor 160. The shift data compressor 160 outputs RLE compressed shift data 162, in a form such as a packets, for storage in the compressed shift data buffer 182. These RLE shift data packets 162 can be of variable length, or alternatively, of fixed length, depending on the RLE implementation chosen.

The compressed running error buffer 180 is a FIFO buffer. Current error compressor 150 compresses a current line running error 122 for a pixel in a current line of an image to thereby form the compressed current running error 152A which is stored in buffer 180.

The calculation of the current line running error 122 itself depends, in part, on the partial errors 306A, 306B, 306C contributed by pixels in the previous line, as discussed above with reference to FIG. 3. Therefore, before the current error compressor 150 compresses the current running error 122, a compressed previous running error 156 is retrieved from the buffer 180 and is decompressed by the previous error decompressor 158. To reconstitute the previous running error (or more precisely, a truncated version of it), the compressed previous running error 156 and its associated shift value are needed. The stored compressed previous running error 156 must first be retrieved from the compressed running error buffer 180 and then decompressed by previous error decompressor 158. It should be noted that the decompression of the compressed previous running error 156 can be implicit. Since the decompressed previous running error is to be multiplied by a coefficient 350, it is possible to apply the shift to the coefficient rather than apply it to the compressed previous running error. Likewise, the coefficient could be stored in a preshifted form eliminating the need for a shift at all.

To perform this decompression, the shift data decompressor 168 first retrieves the appropriate compressed shift data 166 from the compressed shift data buffer 182, then decompresses this to reconstitute the error shift value for each needed pixel's compressed running error in the previous line, and lastly supplies the corresponding reconstituted error shift value 170 to the previous error decompressor 158. The previous error decompressor 158 then uses this reconstituted error shift value 170 to shift the compressed previous running error 156 by the appropriate amount to form the truncated previous line running error 124 that is supplied to error diffusion processor 120.

In the present context, "truncation" refers to the fact that while the order of magnitude of the truncated running error is comparable to that of the original current running error, its least significant bits are not contained in that value.

In summary, then, it can be seen that the compression/decompression subsystem 190 includes a first compressor 150 connected to the error diffusion processor 120 and configured to retain, at most, only the m most significant bits of each of a plurality of current running errors to thereby form a corresponding plurality of compressed current running errors 152A. The compression/decompression subsystem 190 also includes a second compressor 160 configured to compress information sufficient to create a truncated previous line running error 124 corresponding to its original current running error 122, from the compressed previous running error 156.

As mentioned above, error diffusion is performed in line order, and so all the pixels belonging to a single line are processed one after the other. Then, in the general case, one may consider the $i^{th}$ pixel in a line of image data to have an N-bit current running error with the most significant bit in bit position $J_i$, $N > J_i$. If $J_i < 12$, the current running error is shifted to the right by $k_i = 4$ bits, the m=8 bits in bit positions [7:0] are stored in the compressed error buffer, and the shift value $k_i$ itself is sent to the second compressor 160. If $J_i \geq 12$, the current running error is shifted to the right by a number of bits $k_i$ such that its most significant bit ends up in bit position 7, the m=8 bits in bit positions [7:0] are again stored in the compressed error buffer, and the shift value $k_i$ itself is again sent to the second compressor 160. Finally, the various corresponding $k_i$ shift values are compressed.

Since the compressed running error buffer 180 is a FIFO buffer, as the first compressor 150 accepts a new running error 122, the previous error decompressor 158 outputs a truncated previous line running error 124, the appropriate location in the compressed running error buffer 180 being overwritten in the process. It is further understood from FIG. 3 that since three such truncated error values ("receive back total", "receive above total", and "receive forward total") are needed at one time by the summer 304, the diffusion processor 120 must include appropriate registers, circuitry, buffers and the like, all well within the knowledge of one skilled in the art, to accommodate this requirement.

Considerable savings in buffer memory from using the two compressors 150, 160 with the dynamic shifting can be realized. Assuming that m=8 MSBs are stored in the compressed running error buffer 180, and further assuming that RLE compression of the error shift values 154 requires 1 bit for every 10 pixels, a line of 5400 pixels requires that roughly 5400×8+540=43,740 bits of data be stored by compressed running error buffer 180 and compressed shift data buffer 182. This is a savings of about 42,660 bits, or roughly 49% fewer bits than would be required if all 5400×16=86,400 bits of the current running error 122 were stored. If, instead, only m=4 MSBs were stored (in which case the remainder 122 (352 in FIG. 3) returned to the error diffusion processor would be 8 or 9 bits), then only 5400×8+540=22140 bits of data would have to be stored, for a savings of about 74% over storing all 86,400 bits.

FIGS. 2A-2D present four different embodiments for the error spread coefficient subsystem circuitry 130 seen in FIG. 1.

Figure 2A:
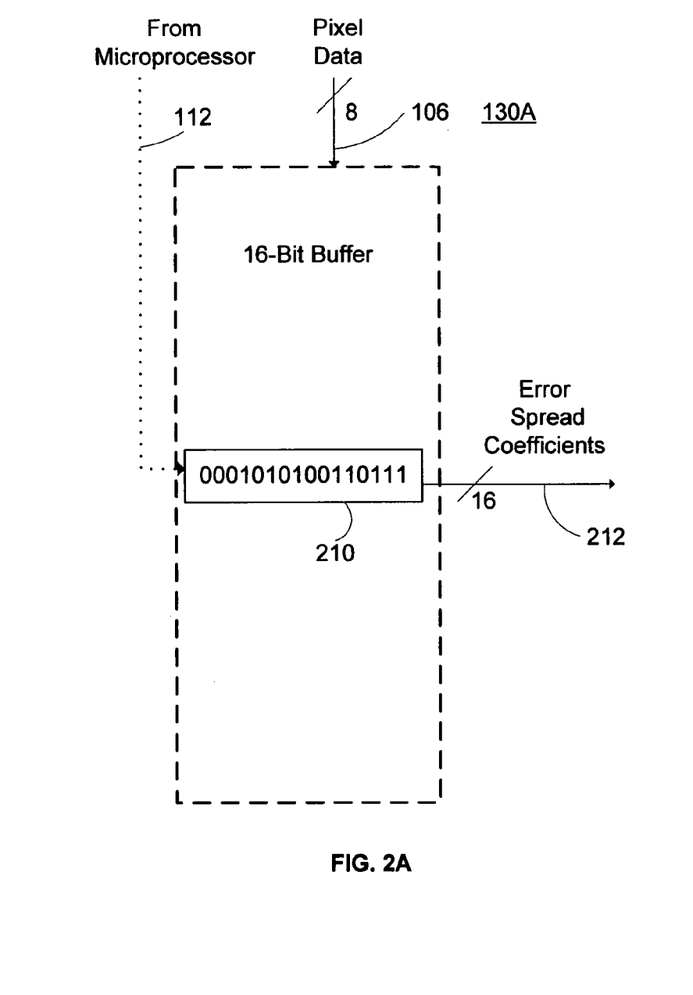
FIG. 2A shows a first embodiment of an error spread coefficient subsystem in accordance with the present application.

In FIG. 2A, the error spread coefficient subsystem circuitry 130A uses a static 16-bit error spread vector 210. The error spread vector 210 comprises error spread information that is used by the error diffusion processor 120 to determine how to weight the total error from each of four previously transformed adjacent pixels in preparation for summer 304. In one embodiment, this error spread information comprises four 4-bit error spread coefficients 212. For this, the 16-bit error spread vector 210 can be considered as four 4-bit numbers ranging from 0-15, each number corresponding to the relative weight one of the four error spread weights discussed above. Thus, as seen in FIG. 2A, the first four bits [15:12] of the 16-bit error spread vector 210 comprises "0001", which corresponds to a weight of 1 (for the "back" coefficient" 350A), the next four bits [11:8] comprises "0101", which corresponds to a weight of 5 (for the "above" coefficient 350B), next four bits [7:4] comprises "0011", which corresponds to a weight of 3 (for the "forward" coefficient 350C), and the last four bits [3:0] comprises "0111", which corresponds to a weight of 7 (for the "left" coefficient 350D).

The error diffusion processor 120 uses each of these 4-bit values as a relative weighting, and so multiplies each of the truncated running errors by an appropriate corresponding 4 bit value to create four partial errors 306A, 306B, 306C and 306D used in the summer 304 within the error diffusion processor 120. When the 16-bit error spread vector 210 is provided to the error diffusion processor 120, the latter understands the meaning of the four groupings of bits and uses them accordingly.

Figure 2B:
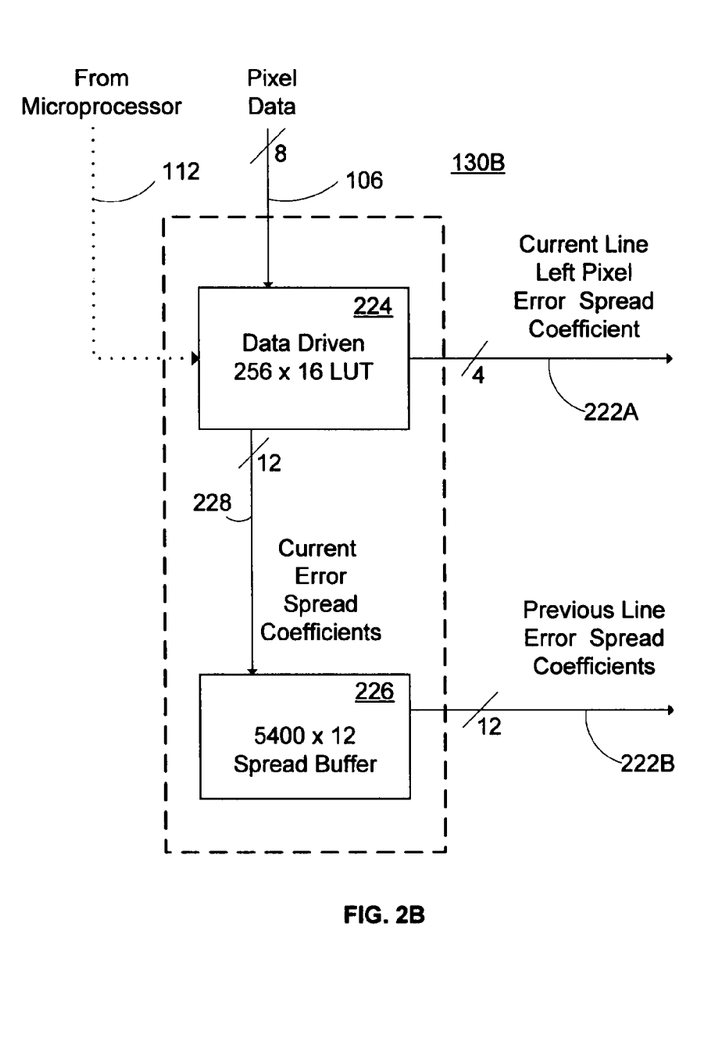
FIG. 2B shows a second embodiment of an error spread coefficient subsystem in accordance with the present application.

In FIG. 2B, the error spread coefficient subsystem 130B uses a pixel data-driven paradigm to determine the error spread coefficients. The 8-bit gray-level value of the pixel data 106 being transformed is used to select from among a predetermined set of four error spread coefficients, each set comprising a 16-bit error spread vector. In particular, the 8-bit pixel data is input to a 256×16 bit lookup table (LUT) 224. Each entry in the lookup table 224 comprises a set of four 4-bit error spread coefficients, one for each of the 256 possible 8-bit gray level values (0-255), which are used to index the appropriate entry in the lookup table 224.

In the case of error spread coefficient subsystem 130B, each of the 256 error spread vectors comprises four 4-bit weights dictating how to spread the running error from the current pixel to adjacent untransformed pixels. This contrasts with embodiment 130A where the fixed error spread vector 210 dictates how to weight the total error from each of the previously transformed pixels in preparation for summer 304.

In response to a particular 8-bit pixel value input thereto, the lookup table 224 supplies the appropriate 16-bit error spread vector and splits it in two parts. The first part comprises a 4-bit weight that is sent via output 222A to the error diffusion processor 120 for use as the "receive left" coefficient 350D for the next pixel (and also happens to be the "send right" coefficient for the current pixel). The second part is a 12 bit value 228 which comprises the "send back", "send below" and "send forward", coefficients for the current pixel. These are stored in a 5400×12-bit spread buffer 226 (12 bits for each pixel in a row) again assuming 600 ppi by 9 inch line length. The error diffusion processor 120 retrieves the appropriate set of previous line "receive" coefficients via output 222B of the error spread coefficient subsystem 130B.

Figure 2C:
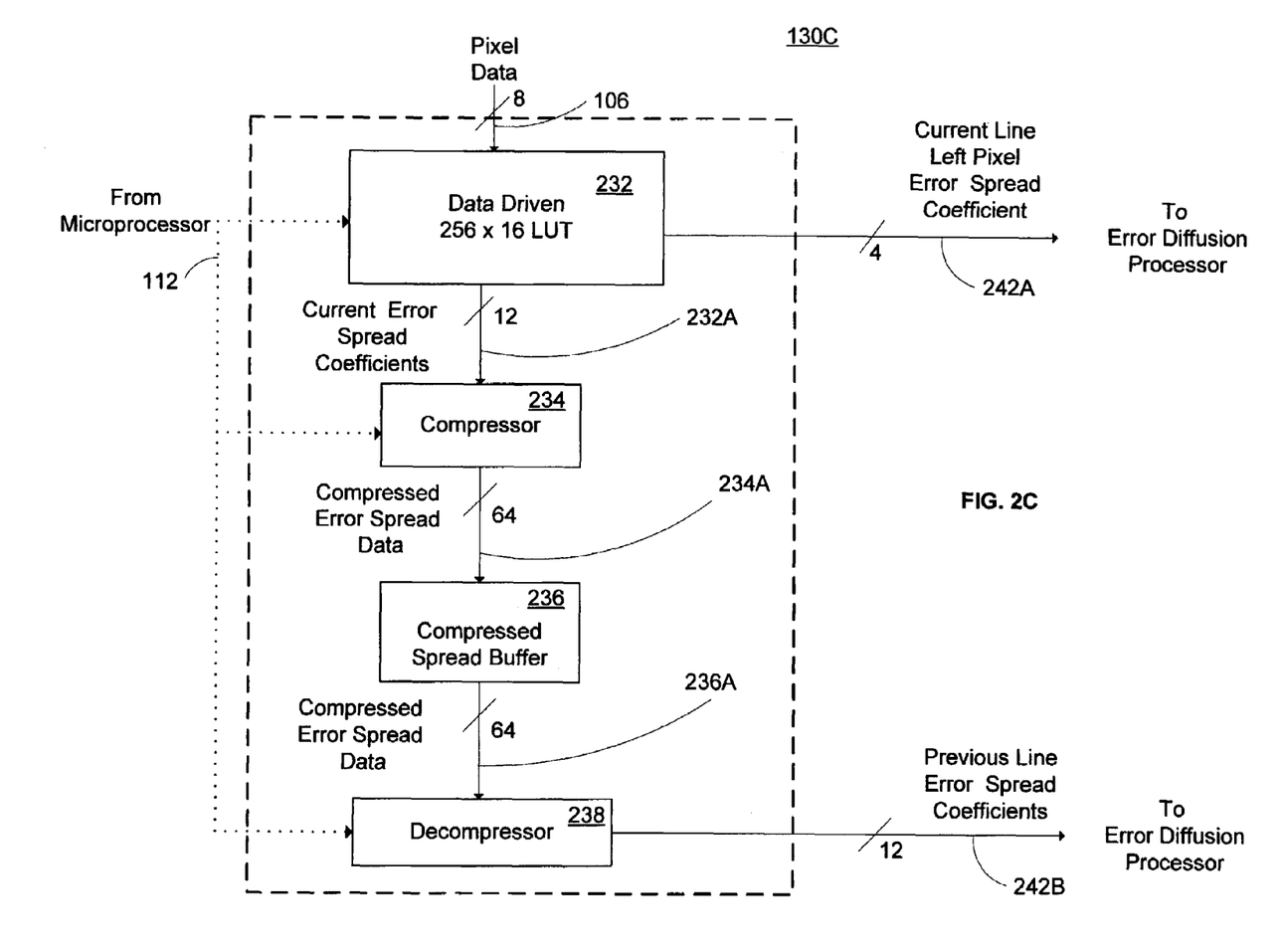
FIG. 2C shows a third embodiment of an error spread coefficient subsystem in accordance with the present application.

FIG. 2C shows a third embodiment of an error spread coefficient subsystem 130C. The error spread coefficient subsystem 130B of FIG. 2B required a 5400×12-bit spread buffer 226, totaling 64,800 bits of data. The error spread coefficient subsystem 130C of FIG. 2C uses less memory by compressing a plurality of consecutive sets of the 12-bit error spread coefficient data that ultimately will be used in the error diffusion processor 120 as the "receive back", "receive above" and "receive forward" coefficients 350A, 350B, 350C, respectively.

The error spread coefficient subsystem 130C of FIG. 2C includes a 256×16 data-driven lookup table 232 which behaves much the same as lookup table 224 in error spread coefficient subsystem 130B of FIG. 2B. Thus, an indexed 16-bit error spread vector is split into two parts, the first part being the same 4-bit weight provided to the error diffusion processor via output 242A. The second part, which is the 12 bit value 232A comprising the current set of "send backward", "send below", and "send forward" 4-bit error spread coefficients is sent to block compressor 234.

Block compressor accepts a plurality of consecutive sets of 12-bit error spread coefficients, and outputs compressed error spread data 234A corresponding to these consecutive 12-bit error spread coefficients. These compressed error spread data can be in the form of multi-bit, such as 64-bit, compressed data blocks 234A. These blocks 234A of compressed 12-bit error spread coefficients are then stored in compressed spread buffer 236. Thus, in this third embodiment 130C, the compressor 234 is configured to compress a plurality of sets of at least three of said four error spread coefficients to thereby form compressed error spread data 234A.

When the error diffusion processor 120 needs to retrieve a set of previous line "receive" coefficients, the decompressor 238 selectively retrieves the appropriate compressed error spread coefficient block 236A from the compressed spread buffer 236, decompresses it, and provides the required information to the error diffusion processor 120 via output 242B.

Compression of consecutive 12-bit sets is possible because of their redundancy. This redundancy is due to a combination of two factors: (1) although the lookup table 232 stores one error spread vector for each gray level value, these vectors are not unique—as few as only 16 or so different vectors may need to be stored—thus, two gray level values that are close to each other typically will index entries comprising identical error spread vectors; and (2) in a line of an image, due to the relatively low spatial frequencies, it is not uncommon for runs of adjacent pixels' gray level values to be identical or very close to one another, and so these map onto the same error spread vector. The degree of compression depends on such factors as the spatial frequencies present in image, the number of different error spread vectors in the lookup table 232, the correlation between neighboring gray level values and the error spread vectors onto which they map, and the like.

Figure 2D:
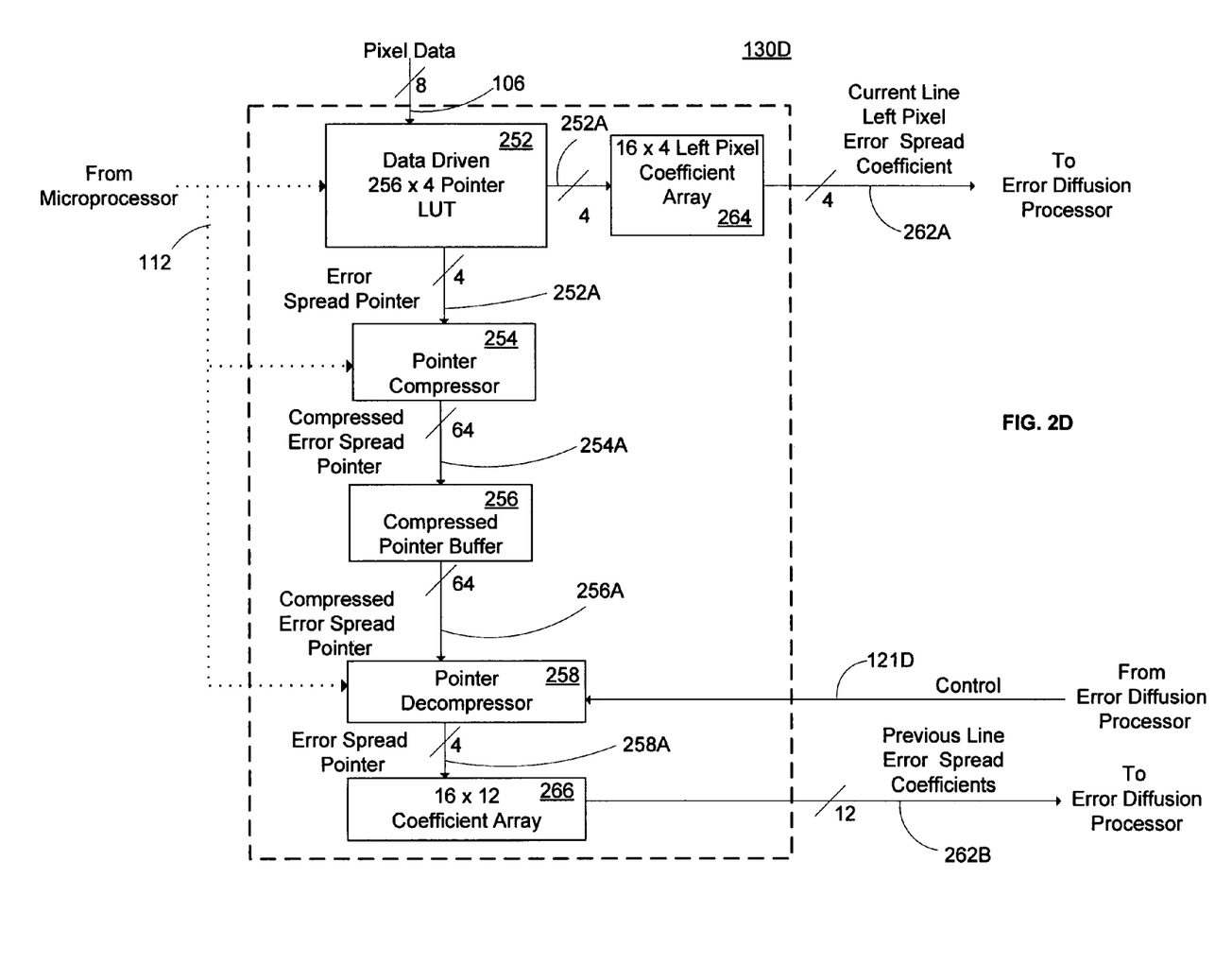
FIG. 2D shows a first embodiment of an error spread coefficient subsystem in accordance with the present application.

FIG. 2D shows a fourth embodiment of an error spread coefficient subsystem 130D. The error spread coefficient subsystem 130D includes a 16×4 bit left pixel coefficient array 264, and a 16×12 error spread coefficient array which stores 16 predetermined sets of three 4-bit coefficients which ultimately will be used in the error diffusion processor 120 as the "receive back", "receive above" and "receive forward" coefficients 350A, 350B, 350C, respectively.

In this embodiment, incoming 8-bit pixel data 106 first indexes 256×4 bit pointer lookup table 252. In response to a pixel value, the pointer lookup table 252 outputs a 4-bit error spread pointer 252A to left pixel coefficient array 264 and to pointer compressor 254.

The 4-bit pointer 252A selects one from among 16 possible ($2^4$) entries in the 16×4 bit left pixel coefficient array 264. In response to the 4-bit error spread pointer 252A, left pixel coefficient array 264 provides the error diffusion processor 120, via output 262A, the "receive left" coefficient 350D for use by the next pixel that is processed.

The 4-bit error spread pointer 252A is also supplied to a pointer compressor 254 which compresses a plurality of consecutive pointers to thereby from compressed error spread pointer information 254A. In one embodiment this compressed error spread pointer information 254A is formed as 64-bit compressed pointer blocks 254A which are then stored in a compressed pointer buffer 256.

When the error diffusion processor 130 needs the "receive back", "receive above" and "receive forward" coefficients 350A, 350B, 350C, respectively, it sends appropriate control signals 121D to the pointer decompressor 258 within the error spread coefficient subsystem 130D.

Decompressor 258 then obtains the correct compressed pointer block(s) 256A from the compressed pointer buffer 256, decompresses the compressed error spread pointer information and thereby forms at least one decompressed 4-bit error spread pointer. The appropriate decompressed 4-bit error spread pointer(s) are then used to retrieve the needed coefficients. In this regard, it should be noted that in embodiments where the coefficient array 266 comprises the triplet of "send backward", "send below" and "send forward" 4-bit error spread coefficients, more than one such 12-bit triplet may need to be retrieved, since the "receive backward", "received above" and "receive forward" coefficients 350A, 350B, 350C, respectively, may belong to as many as 3 different entries within the 16 entry coefficient array 266.

The present invention has been described with respect to specific embodiments. However, it will be appreciated that modifications and variations of the present invention are covered by the above teachings and within the purview of the appended claims without departing from the spirit and intended scope of the invention.

The invention claimed is:

1. An error diffusion system configured to perform halftoning of image pixel data, the system comprising:
 an error diffusion processor configured to receive a current pixel from a current image line and output an error diffused current pixel in response thereto;
 a first decompressor connected to the error diffusion processor and configured to decompress a compressed previous running error of a pixel belonging to a previous line of said image for use in calculating an adjusted pixel value of said current pixel; and
 a first compressor connected to the error diffusion processor and configured to compress a current running error of said current pixel to thereby form a compressed current running error for said current pixel.

2. The error diffusion system according to claim 1, further comprising:
 a second compressor configured to compress first information received from the first compressor, the first information sufficient to decompress said compressed current running error.

3. The error diffusion system according to claim 2, wherein:
 the second compressor employs run length encoding to compress said first information.

4. The error diffusion system according to claim 1, wherein:
 said current running error comprises N bits;
 said first compressor retains a maximum of m most significant bits of the N bits to form said compressed current running error; and
 N and m are both integers greater than 0 with N>m.

5. The error diffusion system according to claim 4, wherein N is 16 and m is 8.

6. The error diffusion system according to claim 4, wherein:
 the first compressor shifts said current running error by a corresponding shift value so as to retain a maximum of m most significant bits.

7. The error diffusion system according to claim 4, further comprising a second compressor configured to compress first information received from the first compressor, the first information sufficient to decompress said compressed current running error.

8. The error diffusion system according to claim 7, wherein:
 the first compressor shifts said current running error by a corresponding shift value so as to retain a maximum of m most significant bits; and
 said first information comprises said corresponding shift value.

9. The error diffusion system according to claim 8, wherein:
 the second compressor employs run length encoding to compress said first information.

10. The error diffusion system according to claim 1, further comprising:
 a compressed running error buffer having a size sufficient to store a compressed running error for each image data pixel belonging to a line of image data.

11. The error diffusion system according to claim 1, further comprising:
 an error spread coefficient subsystem configured to provide error spread coefficients to the error diffusion processor.

12. The error diffusion system according to claim 11, wherein the error spread coefficient subsystem comprises:
 a first lookup table indexed by a pixel value of a current pixel being processed, each entry in the lookup table comprising a set of four error spread coefficients.

13. The error diffusion system according to claim 11, wherein the error spread coefficient subsystem further comprises:
 a coefficient spread buffer having a size sufficient to store three error spread coefficients for each pixel belonging to a line of image data.

14. The error diffusion system according to claim 13, wherein the error spread coefficient subsystem further comprises:
 a third compressor configured to compress a plurality of sets of at least three of said four error spread coefficients to thereby form compressed error spread data; and
 a decompressor configured to selectively decompress said compressed error spread data.

15. The error diffusion system according to claim 11, wherein the error spread coefficient subsystem further comprises:
 a first lookup table indexed by a pixel value of a current pixel being processed, each entry in the first lookup table comprising a pointer to error spread data;
 a third compressor configured to compress a plurality of said painters to thereby form compressed error spread pointer information;
 a decompressor configured to selectively decompress said compressed error spread pointer information to thereby form at least one decompressed pointer; and
 a coefficient array indexable by said at least one decompressed pointer.

16. The error diffusion system according to claim 1, wherein:
 the error diffusion processor, the first decompressor and the first compressor all belong to a single integrated circuit.

17. A method for handling running error values during a halftoning operation on an image, the method comprising:

decompressing a compressed previous running error of a pixel belonging to a previous line of said image to form a truncated previous running error for use in calculating an adjusted pixel value of a current pixel in a current line of an image; and compressing a current running error of said current pixel in a current line of an image to thereby form a compressed running error for that pixel.

18. The method according to claim 17, wherein:

said current running error comprises N bits;

said compressing step comprises retaining a maximum of m most significant bits of the N bits to form said compressed running error, where N and m are both integers greater than 0 with N>m.

19. The method according to claim 18, wherein:

said compressing step comprises shifting said current running error by a corresponding shift value so as to retain a maximum of in most significant bits.

20. The method according to claim 19, wherein:

N is 16 so that the current running error has bit positions in the range [15:0] with 0 designating the least significant bit; and said compressing step comprises:

shifting the current running error to the right by 4 bits, if the most significant bit of the current running error is in a bit position lower than 12; and shifting the current running error to the right by a number of bits sufficient to leave only in bits, if the most significant bit of the current running error is in bit position 12 or higher.

21. The method according to claim 19, further comprising: compressing said corresponding shift value.

* * * * *